(12) United States Patent
Crepin et al.

(10) Patent No.: US 9,604,425 B2
(45) Date of Patent: Mar. 28, 2017

(54) METHOD FOR PRODUCING A LEADING EDGE SKIN BY BAKING A STACK INCORPORATING HEATING ELEMENTS AND LAYERS OF PRE-IMPREGNATED FIBRES

(71) Applicant: SONACA S.A., Gosselies (BE)

(72) Inventors: Jean-Philippe Crepin, Ath (BE); Dimitri Gueuning, Rixensart (BE)

(73) Assignee: SONACA S.A., Gosselies (BE)

( * ) Notice: Subject to any disclaimer, the term of this patent is extended or adjusted under 35 U.S.C. 154(b) by 257 days.

(21) Appl. No.: 14/380,588

(22) PCT Filed: Feb. 22, 2013

(86) PCT No.: PCT/EP2013/053519
§ 371 (c)(1),
(2) Date: Aug. 22, 2014

(87) PCT Pub. No.: WO2013/124397
PCT Pub. Date: Aug. 29, 2013

(65) Prior Publication Data
US 2015/0174843 A1    Jun. 25, 2015

(30) Foreign Application Priority Data

Feb. 24, 2012   (BE) .................................. 2012/0107

(51) Int. Cl.
*B29C 70/48*   (2006.01)
*B29C 70/68*   (2006.01)
(Continued)

(52) U.S. Cl.
CPC .......... *B29D 99/001* (2013.01); *B29C 70/021* (2013.01); *B29C 70/462* (2013.01);
(Continued)

(58) Field of Classification Search
CPC ... B29C 70/021; B29C 70/462; B29C 70/885; B29C 70/68
See application file for complete search history.

(56) References Cited

U.S. PATENT DOCUMENTS 2,562,976 A * 8/1951 Winnick .................. B64C 3/26
                                                    144/349
4,560,523 A * 12/1985 Plumley ................ B29C 70/443
                                                    264/102
(Continued)

FOREIGN PATENT DOCUMENTS

BE          524357       12/1953
EP       1 757 519 A2     2/2007
(Continued)

OTHER PUBLICATIONS

Black, Sara, SQRTM enables net-shape parts, Composites World (Sep. 2010) 5 pages.*
(Continued)

*Primary Examiner* — Matthew Daniels
(74) *Attorney, Agent, or Firm* — Oblon, McClelland, Maier & Neustadt, L.L.P.

(57) ABSTRACT

A method for producing a skin of a leading edge for an aircraft wing element, including an assembly of resistive heating elements designed to form an integral part of a system for de-icing and/or anti-icing of the leading edge. The method includes curing a stack in a mold between two molding surfaces facing each other. The stack includes the resistive heating elements assembly, two adhesive films arranged respectively on either side of the assembly so that the heating elements adhere to each of these two adhesive films, two layers of electrically insulating pre-impregnated fibers adhering respectively to the two adhesive films on the (Continued)

sides opposite those receiving the heating elements, and a plurality of layers of pre-impregnated carbon fibers.

11 Claims, 6 Drawing Sheets

(51) Int. Cl.
| | |
|---|---|
| *B29D 99/00* | (2010.01) |
| *B64C 9/22* | (2006.01) |
| *B64D 15/12* | (2006.01) |
| *B29C 70/46* | (2006.01) |
| *B29C 70/88* | (2006.01) |
| *B29C 70/02* | (2006.01) |
| *B29L 31/30* | (2006.01) |

(52) U.S. Cl.
CPC ............ *B29C 70/68* (2013.01); *B29C 70/885* (2013.01); *B64C 9/22* (2013.01); *B64D 15/12* (2013.01); *B29L 2031/3085* (2013.01); *Y02T 50/32* (2013.01)

(56) References Cited

U.S. PATENT DOCUMENTS

| | | | |
|---|---|---|---|
| 4,574,474 A * | 3/1986 | Langham | B29C 45/14639 264/272.15 |
| 4,621,880 A * | 11/1986 | Rush | H05K 3/3426 439/79 |
| 5,807,454 A * | 9/1998 | Kawabe | B29C 70/443 156/214 |
| 6,031,214 A | 2/2000 | Bost et al. | |
| 6,137,083 A | 10/2000 | Bost et al. | |
| 2003/0121906 A1* | 7/2003 | Abbott | B29C 45/73 219/543 |
| 2007/0045477 A1 | 3/2007 | Armstrong et al. | |
| 2007/0210073 A1 | 9/2007 | Hubert et al. | |
| 2010/0266808 A1 | 10/2010 | Klein et al. | |

FOREIGN PATENT DOCUMENTS

| | | |
|---|---|---|
| EP | 1 826 119 A2 | 8/2007 |
| EP | 1 826 119 A3 | 8/2007 |
| FR | 1 224 058 | 6/1960 |
| FR | 2 744 872 A1 | 8/1997 |

OTHER PUBLICATIONS

International Search Report issued Jul. 8, 2013, in PCT/EP13/053519 filed Feb. 22, 2013.

Belgium Search Report issued Dec. 18, 2012, in Belgium Application No. 201200107 filed Feb. 24, 2012.

* cited by examiner

METHOD FOR PRODUCING A LEADING EDGE SKIN BY BAKING A STACK INCORPORATING HEATING ELEMENTS AND LAYERS OF PRE-IMPREGNATED FIBRES

TECHNICAL FIELD

The invention relates to the field of de-icing and anti-icing of the leading edge of an aircraft wing element.

It relates in particular to the manufacture of a leading edge skin which incorporates resistive heating elements for de-icing and/or anti-icing of the leading edge. In a known manner, de-icing and anti-icing are two distinct actions implemented using resistive elements arranged at different locations on the leading edge and supplied by separate electrical power supplies.

The invention is preferably applied to a movable flap of the leading edge of an aircraft wing.

THE STATE OF THE PRIOR ART

Icing of an aircraft wing leading edge occurs when it passes through a cloud of water droplets which are, despite an ambient temperature of less than 0° C., in the liquid state. This state is generally called "supercooled". The liquid water then freezes almost instantaneously on the aircraft's leading edges. This leads to an accumulation of ice and to a change in the external shape of the wing elements.

Consequently icing has a significant impact on the safety and aerodynamic performance of aircraft. It adversely affects the quality of the air-flow and increases drag, whilst reducing the wing's lift. By modifying the external profile of the wing it can reduce stability and adversely affect handling and the safety of the aircraft. It can also lead to uncontrollable pitching and rolling of the aircraft. It also leads to increased aircraft fuel consumption, and deterioration of general levels of performance.

Systems to protect the leading edges against icing have been widely developed in the past. In this respect several sorts of icing protection systems exist which use different sources of energy and two main philosophies for preventing the accumulation of ice, namely anti-icing and de-icing. The great majority of large commercial jet aircraft are provided with an icing protection system based on the ejection of hot air onto the surfaces exposed to icing, since hot air is easy to produce and to extract. Although widely used, this solution requires air to be extracted at the engine compressor. This inevitably leads to a degradation of the thermodynamic cycle and therefore to a reduction in the levels of performance of the engine.

Electrical power has therefore been put forward as a possible alternative, since it is easy to produce and to carry to the systems which consume the electricity. Its main advantage is that is results in fewer adverse effects on levels of engine performance.

In this context the electro-thermal solution has rapidly gained acceptance, since it allows anti-icing and/or de-icing of the leading edge of wings to be carried out. It should be noted that just as for the "hot air" principle an electro-thermal system heats the protected zone in order to make the water that is present melt of evaporate.

Until now however the known solutions for manufacturing such leading edges have not proven to be entirely satisfactory, in particular due to difficulties in incorporating the resistive heating elements designed to provide the heat required for protection against surface ice.

SUMMARY OF THE INVENTION

The purpose of the invention is therefore to at least partially provide a solution to the above mentioned disadvantages relating to the embodiments of the prior art.

In order to do this, the object of the invention is a method for producing a leading edge skin for aircraft wing elements, comprising an assembly of resistive heating elements designed to form an integral part of a system for de-icing and/or anti-icing of the leading edge, said method being characterised in that it comprises a step of baking a stack in a mould between two moulding surfaces facing each other, said stack comprising the following elements:

said resistive heating elements assembly;

two adhesive films arranged respectively on either side of said assembly, so that the heating elements adhere to each of these two adhesive films;

two layers of electrically insulating pre-impregnated fibres, adhering respectively to said two adhesive films on the sides opposite those receiving said heating elements; and a plurality of layers of pre-impregnated carbon fibres.

Overall the invention provides a simple, effective and high-performance solution for the manufacture of a leading-edge skin which incorporates resistive heating elements.

The invention is remarkable in particular in that it guarantees that a leading edge is obtained where the positioning of the resistive heating elements is very precise, thanks to the use in the stack of adhesive films and layers of pre-impregnated carbon fibres whose tack levels provide mutual support of these layers during the preparation of the stack and during their placement in the mould. The stack can therefore be handled before it is cured with less risk of the layers undergoing displacement relative to each other, unlike when dry fibres are used. Similarly, this specific feature advantageously opens up possibilities for automation of the forming of the various layers in the stack.

The use of pre-impregnated fibres is also advantageous in that these materials are already qualified for the aeronautic field. No additional qualification is required, which means no additional costs for the implementation of the method. Furthermore, these pre-impregnated fibres usually confer better mechanical behaviour than the dry fibres generally used for the manufacture of composite material parts by RTM (Resin Transfer Moulding).

In this respect the invention is preferably designed to be based on a so-called SQRTM (Same Qualified Resin Transfer Moulding) manufacturing technique, with the main difference between it and the RTM technique is the use of pre-impregnated fibres, that is, not dry fibres.

Moreover, the SQRTM technique makes it possible to use not only layers of 2D, 2.5D or even 3D fabrics, but also so-called unidirectional layers in which the parallel fibres are held against each other by the resin.

Over and above the advantages already stated above associated with the use of pre-impregnated fibres, it should be noted that the SQTRM technique does not require a major flow of resin through the stack during curing, unlike the RTM technique in which all the resin is led in from outside the mould. The resistive heating elements placed within the stack do not cause any degradation of the part obtained whereas, on the contrary, with the use of an RTM technique they would tend to form natural barriers to the resin flow, and consequently dry zones or zones of unacceptable porosity would occur.

Furthermore, the SQTRM technique is implemented by means of a press with heated plates, not within an autoclave. The change from a curing method within an autoclave to a press-based method enables the cycle times and high levels of investment associated with autoclaves to be reduced, thus reducing the manufacturing costs of the leading edge skins.

Curing in a press provides improved geometric control of the internal and external surfaces of the skin. This is very important in particular for achieving a satisfactory level of quality of the aerodynamic profile formed by the external surface. As for the surface quality of the internal surface of the skin, this facilitates the installation of the ribs joining the skin to the wing structural element, and thus improves the ease with which this skin can be removed in service.

The thickness of the skin now becomes fully controlled thanks to the use of two facing moulding surfaces. This also favours the interchangeability of the skins, which is very useful in the event of damage.

Moreover, working with a closed mould means that thermal expansion of the metal panels can be restrained, in the preferred case where the stack incorporates such panels. Thermal expansion beyond the thermal expansion of the mould is therefore prevented. This restriction of the thermal expansion of the metal panels means that stresses on the interfaces between the layers of pre-impregnated fibres, with a low coefficient of thermal expansion, and the metal panels, with a greater coefficient, can be limited. The level of the permanent internal stresses generated at the composite materials/metal panels interfaces is therefore reduced.

Moreover, curing in a press reduces the risk of movement of the stack component elements even further, enhancing the ability to achieve a fully controlled leading edge skin geometry and composition.

Preferably said assembly of resistive heating elements comprises a plurality of electrical connection terminals which pass through one or more holes made through the stack elements located on one side of said resistive heating elements, said connection terminals protruding from said stack in such a way as to be inserted into recesses made on one of the two moulding surfaces. In this case each recess is preferentially filled with a block of silicone through which one or more of said electrical connection terminal passes, so that the latter are not coated with resin during curing.

Preferably, said stack also comprises a metal panel at each end of the stack, partly to meet the requirement for protection against erosion and against lightning, to protect the structure and the resistive elements.

Preferably said layers of pre-impregnated carbon fibres form a core of said stack, with the elements of the latter being arranged symmetrically in relation to said core, except for the assembly of resistive heating elements present on only one side of said core. This symmetry of the layers means that a laminated material of better quality is obtained, in particular by avoiding the problems of deformation on curing.

Said layers of pre-impregnated carbon fibres may however be arranged differently, but still in such a way to carry out the structural function at the skin.

Said heating elements are preferably arranged flat on the corresponding adhesive film, before being placed in the mould. Preferentially, during this deposition the film is already placed on its corresponding layer of pre-impregnated glass fibre, in order to make handling of the assembly that is obtained easier and less sensitive to the risk of tearing.

Preferably said curing step is achieved by the implementation of the following successive operations:
  the circulation of an injection resin in said mould so as to generate a counter-pressure at the periphery of the stack for pressurisation of the resin contained in said stack; then
  stopping the circulation of the injection resin after the stack resin has set, leading to the injection resin being introduced between the stack and each of the two mould surfaces in order to apply a surface pressure on said stack until the injection resin sets.

Thus the injection resin could here be described as forming an integral part of the moulding tooling, since it is used to generate a counter-pressure on the stack resin during its curing. This considerably improves the quality of the laminated material obtained.

More preferably yet said curing step is carried out by implementing the following successive operations.
  heating the mould by means of a heated plate press designed to apply a pressure on the stack via the mould, the heated plates being brought to a temperature T1, and heating of an injection resin designed to be circulated in the mould, the resin being heated to a temperature T0;
  after the stabilisation of the temperature of the heating plates at temperature T1 and ageing of the stack resin, the circulation at a time t1 of the injection resin in the mould, so as to generate a counter-pressure at the periphery of the stack, for pressurisation of the resin contained in the latter, said circulation of the injection resin being carried out at a pressure P'1 with an increase in temperature from the temperature T0 to temperature T1;
  at a time t'1, the pressure of the injection resin and the pressure on the stack applied by the press via the mould, are both brought to a value P1;
  at a time t"1, increase in temperature of the injection resin and of the press, up to a temperature T2 reached at a time t2 which corresponds to the setting of the stack resin;
  after the stack resin has set, stopping the circulation of the injection resin which remains present in the mould, it being introduced between the stack and each of the two mould surfaces in order to apply a surface pressure on said stack until the injection resin sets at a time t3;
  after the injection resin has set, the temperature of the press is maintained at a temperature T2 until a time t4, whereas the pressure on the stack applied by the press via the mould falls to a value P0.

In this respect it should be noted that the operation for raising the temperature of the injection resin and of the press, initiated at time t"1, is preferably carried out at a speed which is between 1.5 and 2.5° C./minute.

Finally, another object of the invention is a method for manufacturing a leading edge of an aircraft wing element using a leading edge skin obtained by the implementation of the method as described above, the method comprising a step which consists of mounting one or more terminal blocks onto an internal surface of said skin and connecting to it said connection terminals for the resistive heating elements. Because of the precision of the positioning of the resistive heating elements and of their connection terminals, which is maintained until the laminated material skin is obtained, and as a result of the tack of the pre-impregnated layers and of the use of adhesive films, the fitting in place of the terminal blocks is easily achieved.

This mechanical connection solution, preferably using threaded attachment of the terminals onto the terminal blocks, is preferable to a solution involving soldered or brazed connections, by allowing access to the electrical resistance connection terminals to be maintained. This solution also results in improved preservation over time.

Other advantages and characteristics of the invention will appear in the non-restrictive detailed disclosure below.

BRIEF DESCRIPTION OF THE DRAWINGS

This description will be made in relation to the appended drawings, wherein.

DETAILED DESCRIPTION OF PREFERRED EMBODIMENTS

Figure 1:
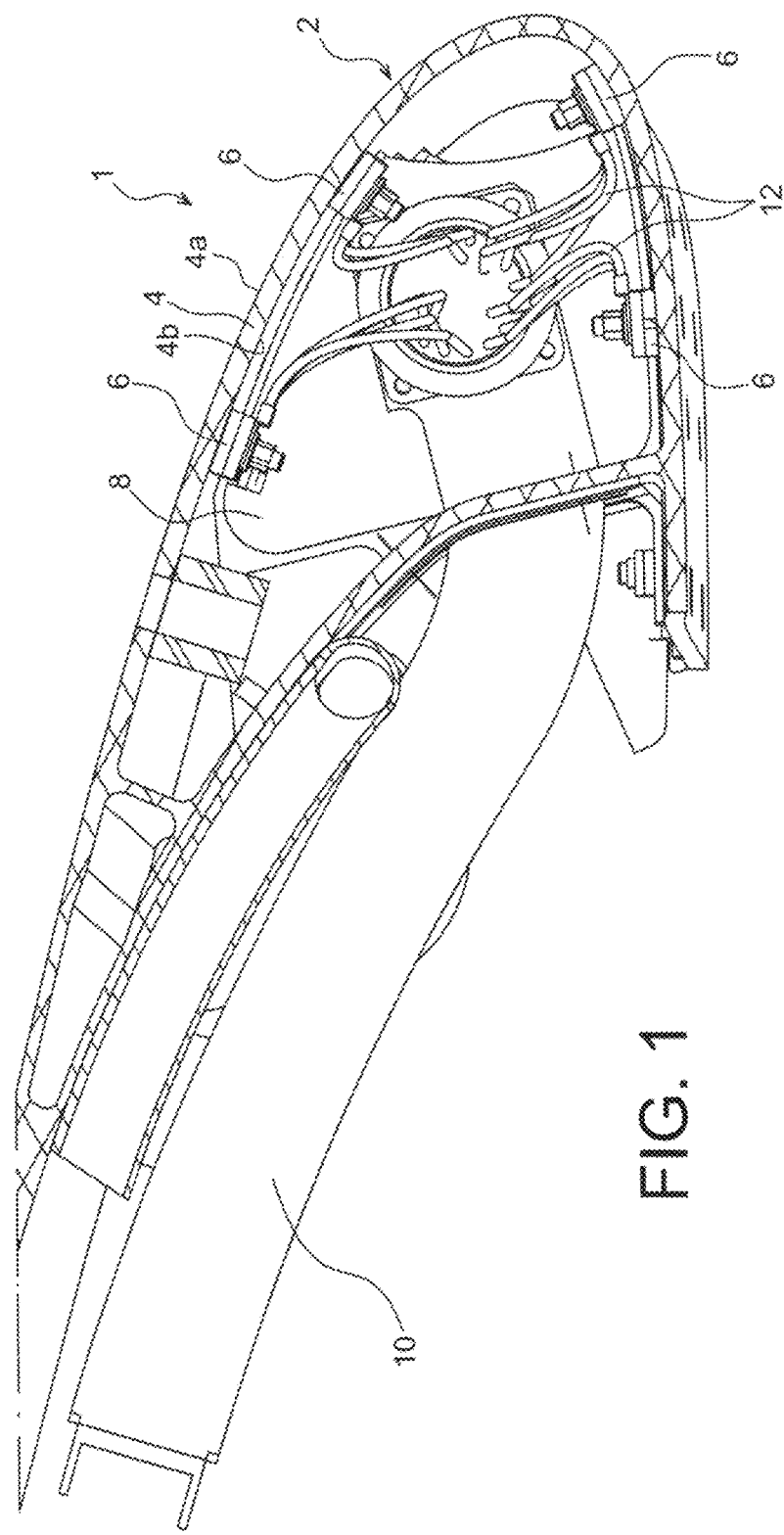
FIG. 1 shows a perspective view of a moving flap of the leading edge of an aircraft wing, which incorporates a leading edge skin obtained using a manufacturing method which is in accordance with the present invention.

With reference first of all to FIG. 1, a movable flap of a leading edge 1 for an aircraft wing is shown where this flap is in particular equipped with a leading edge 2 intended to be obtained by the implementation of a method according to a preferred embodiment of the invention.

The leading edge 2 comprises a skin 4 of low thickness of, for example, between 3 and 20 mm. Its external surface 4a defines the aerodynamic profile of the leading edge, whilst its internal surface 4b is connected to various elements, in particular terminal blocks 6 intended for the electrical connection of the resistive heating elements incorporated into the skin 4. The terminal blocks 6 and the skin 4 together form the leading edge of the flap, with the latter comprising in addition conventional elements of the reinforcement rib 8 type, held against the internal surface 4b and aligned substantially orthogonally to the wingspan direction, and in addition arms 10 allowing the flap to be electrically connected to the main structure of the wing, and/or to guide the removal and refitting of the flap.

Furthermore the wing incorporates a mixed de-icing and/or anti-icing system for the leading edge, designed to protect the aircraft from accumulation of ice on the external surface 4a of the skin 4.

The de-icing and/or anti-icing system which is not clearly visible in FIG. 1, conventionally comprises a source of electrical power, a wiring system 12 for distributing the power required to the surface 4a to be heated, resistive heating elements in the zones to be protected from the accumulation of ice, temperature sensors at the heated surface 4a, a control unit to detect icing conditions and to regulate the heat supplied to the surface, then a control station mounted on a display panel to keep the crew informed of the operation of the system and to activate the system.

The method according to the invention relates to the manufacture of the skin 4, which is made in one piece using the SQRTM technique, starting with the creation of a stack of layers/folds, outside the mould or directly into the mould, and followed by a step for curing this stack.

Figure 2:
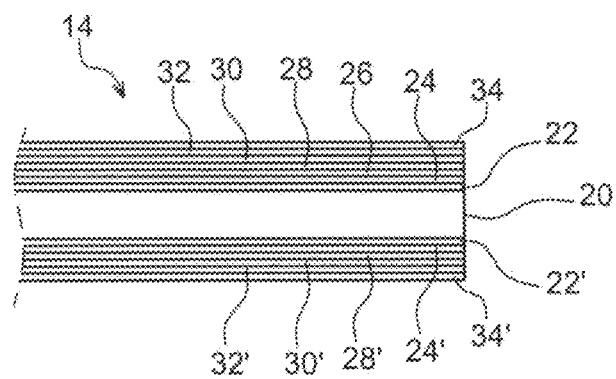
FIG. 2 shows the stack intended to undergo a curing step in order to form the skin shown in the previous figure.

FIG. 2 is a schematic view of this stack 14 after it has been completed.

It comprises a central core, also called the stack core, intended to carry out the structural function of the skin 4. These layers, once laminated are in fact intended to meet the requirement for structural strength and for reduction of the damaging effect of local low-energy impacts on the elements of the surrounding system.

It involves a stack with a plurality of layers of pre-impregnated carbon fibre 20, for example pre-impregnated with Epoxy type resin or BMI (Bismaleimide) type resin. The number of layers may be between 5 and 40, each made of woven fibres or of unidirectional fibres. These are preferably stacked directly one on top of the other, without other elements inserted between them. The tackiness of these layers 20 means that there is satisfactory mutual support between them.

Above the layers of carbon fibre 20 a layer of pre-impregnated glass fibre 22 is placed, for example pre-impregnated with Epoxy type resin or again BMI type resin. An adhesive film 24 covers and adheres by means of one of its two faces, to the layer 22, and in addition on its opposite face, higher in the stack, a resistive heating element assembly 26 also adheres to this film. The film 24 may be of the conventional type, made of polymer for example, again based on Epoxy or BMI resin. Within the stack, the elements are selected so that the resins that they incorporate are of the same nature, for reasons of chemical compatibility. At ambient temperature it exhibits a consistency which allows it to cause the two elements in contact with its two faces respectively, to adhere, although this adhesion is not comparable with structural strength by adhesion as is conventionally meant in the aeronautical field. This structural strength is only achieved after the stack is cured and once the resin which forms this film 24 and which adheres to the adjacent layers has hardened.

The resistive heating elements 26 are electrical heating elements which allow the laminated material to be electro-thermally heated. Their geometry is complex and precise, in order to be able to apply the amount of heating required at all points on the external surface of the skin.

The assembly 26, of a low thickness which does not exceed 120 µm, is also covered by a similar adhesive film 28, itself covered by another layer 30 of pre-impregnated glass fibre. The two glass-fibre layers 22, 30 therefore hugs the resistive elements 26 in such a manner as to electrically insulate them, on the one hand from the carbon fibres 20 and on the other hand from a metal panel 24 which forms the last layer of the stack 14, and which adheres to the layer of glass fibres 30 via another adhesive film 32 which is identical or similar to the previous ones.

The metal plate 34, made of thin titanium or of aluminium, is essentially provided to meet the requirements for protection against erosion and against lightning.

In the stack 14, under the carbon fibre layers 20, overall the same layers as those arranged on top of the core 20 are envisaged. This symmetry, designed to minimise deformation problems on curing, therefore implies that there are successively present, from bottom to top, a metal panel 34', an adhesive film 32', a layer of pre-impregnated glass fibre 30', adhesive films 28', 24' and another layer of glass fibre 22'. The only element missing from the lower part of the stack 14 which prevents there being perfect symmetry in relation to the core 20 is therefore the assembly of resistive heating elements, since there is no benefit in it being present in this zone of the laminated material.

It should be noted that the upper surface of the panel 34 is intended to form the external surface 4a of the leading edge skin, whilst the lower surface of the panel 34' is intended to form the interior surface 4b of the same skin. The panel 34' also confers improved overall mechanical strength to the skin against impacts likely to occur on the external surface of the panel 34.

With reference now to FIGS. 3 to 8, another preferred way of manufacturing the stack 14 is shown.

Figure 3:
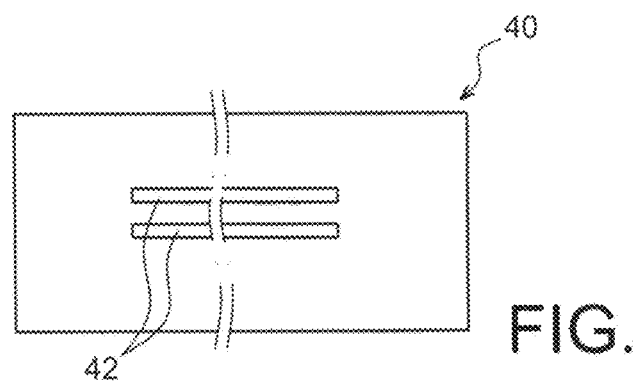
FIGS. 3 to 9 represent the various successive steps in a preferred embodiment of the manufacturing method according to the invention.
Figure 4:
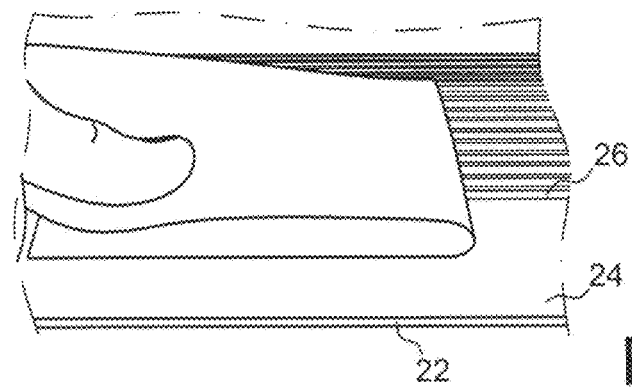
Figure 5:
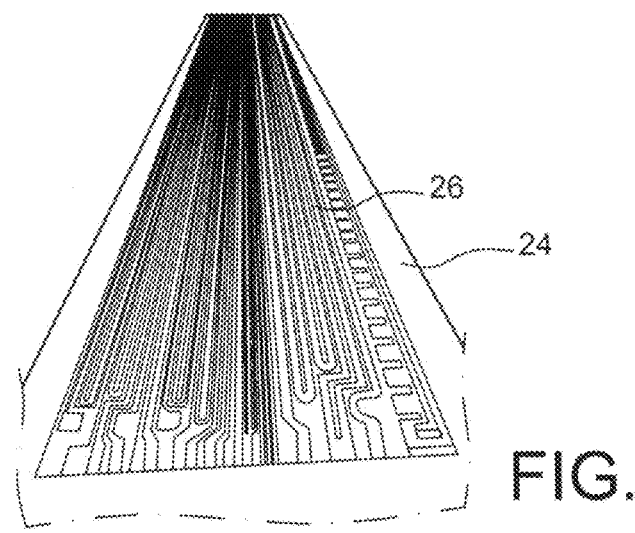

First of all, as can be seen in FIG. 3, the stacking of all the elements intended to be located beneath the layer of glass fibres 22 is carried out, these elements therefore running from the panel 34' to the folds of carbon 20. They form an assembly identified as 40 in FIG. 3, crossed by one or more holes 42 which extend along the direction of stacking and which are here in the form of slots. Forms other than slots may nevertheless be envisaged such as a circular form, without going outside the context of the invention. This assembly 40 may be formed manually or automatically, in the mould or outside it, preferably flat.

Then the adhesive film 24 is adhered to the layer of pre-impregnated glass fibres 22, preferably flat, outside the mould. These two elements 22, 24 also have holes in them so as to extend the slots 42 when they are subsequently placed on the assembly 40, so that these slots extend to the heating elements intended to be adhered onto the film 24. This adhesion is achieved by peeling, as is shown schematically in FIG. 4, and preferably using reference points made by laser beams in order to ensure precise positioning of the resistances 26. The adhesion is such that the assembly obtained, namely the layer of glass fibre 22, the adhesive film 24 and the heating elements 26, may be handled from the initial flat position shown in FIG. 5 to the position where it is implanted on the assembly 40 shown in FIG. 6, without the risk of altering the position of the resistances 26 in relation to the layer 22.

Figure 6:
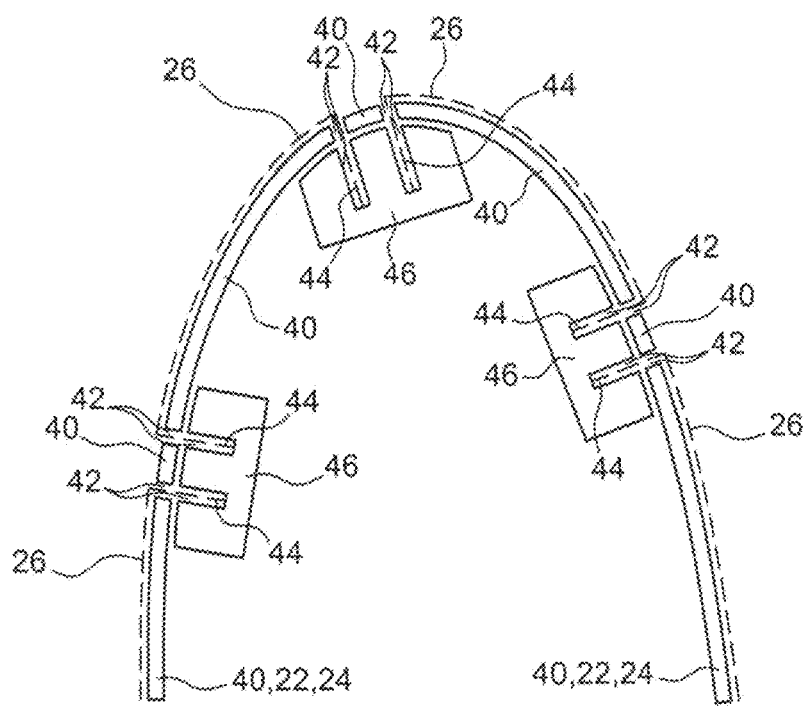

In FIG. 6 it can be seen that the heating elements 26 comprise electrical connection terminals 44 which are inserted through the holes/slots 42 so as to protrude towards the bottom of the stack. The end of these terminals 44 is therefore protected by a silicone block 46 which protrudes from the stack, and therefore from the internal metal panel, so that it is not coated with resin during curing.

Figure 7:
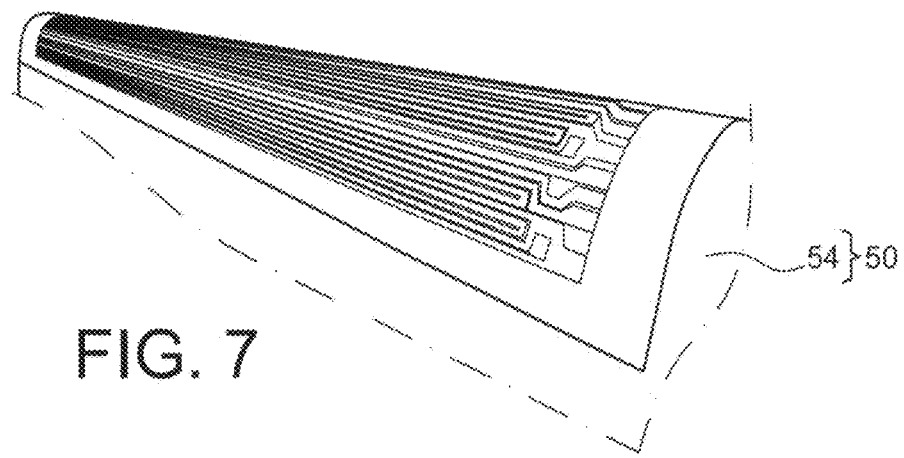
Figure 8:
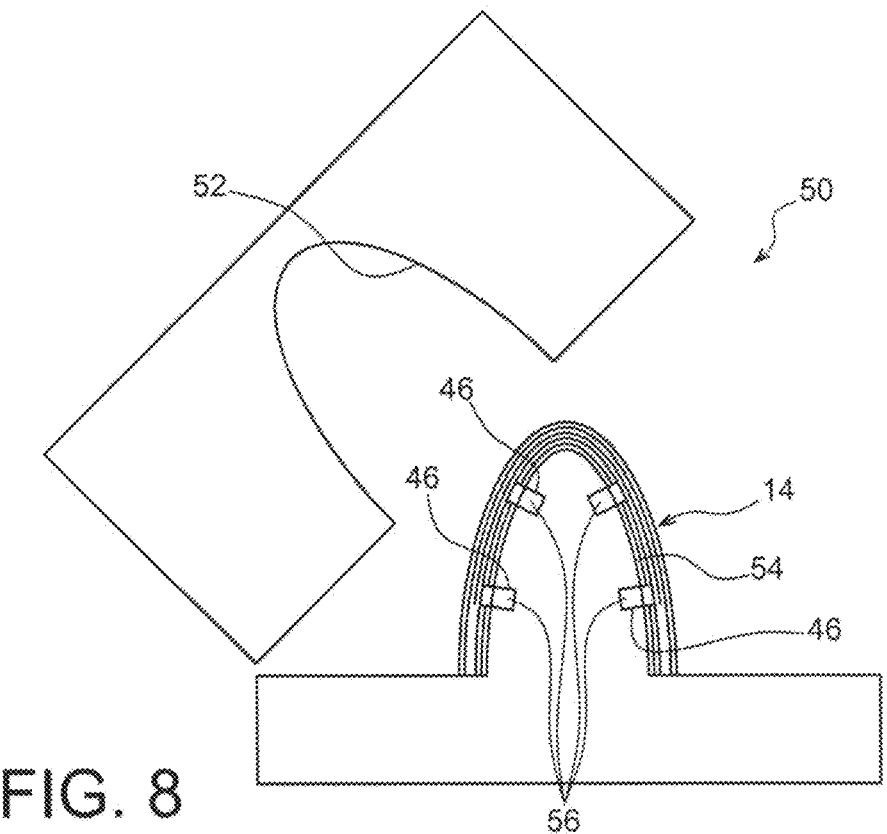

The stack obtained is then placed in a mould 50 shown in FIGS. 7 and 8, this mould having two facing moulding surfaces 52, 54, forming respectively a form and a counter-form.

During the placement of the stacking on the internal surface 54 of the mould, the silicone blocks 46 surrounding the terminal blocks 44 are inserted into matching recesses 56 in this surface 54, as can be seen in FIG. 8.

Then the adhesive film 28, the pre-impregnated glass fibre layer 30, the last adhesive film 32 and the external metal panel 34 are placed in the stack 14 above the resistive elements 26, so as to complete this stack.

Figure 9:
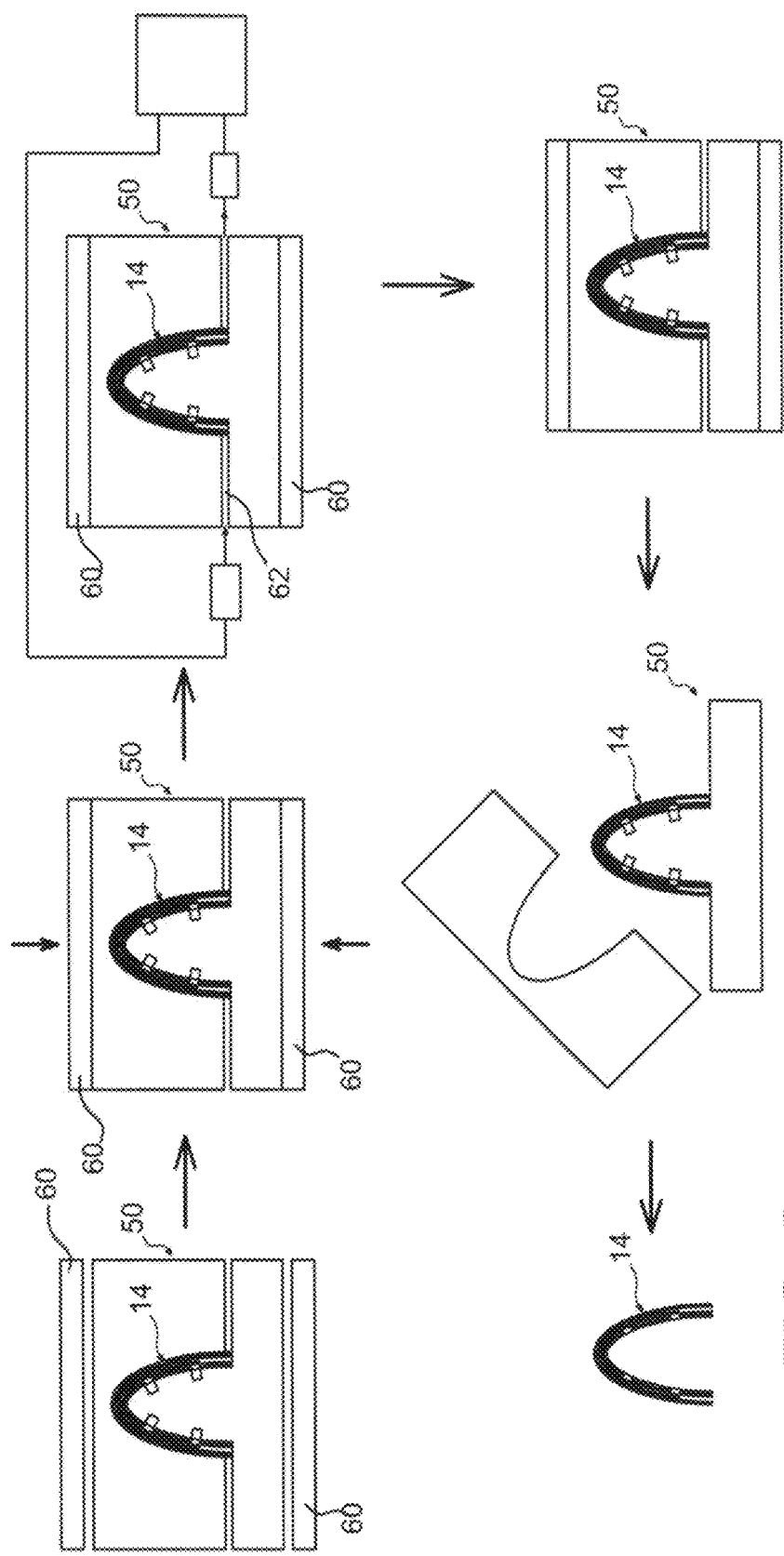
Figure 10:
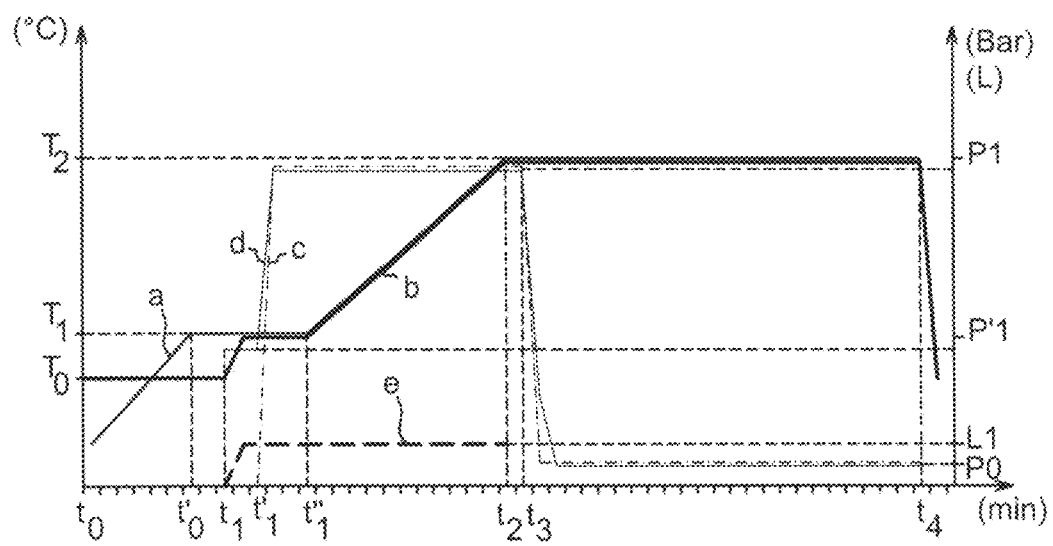
FIG. 10 shows a graph which shows in a detailed manner the various temperature and pressure conditions applied during the curing step of said stack.

FIG. 9 shows the different steps of the SQRTM technique, from the placing of the stack into the mould 50. FIG. 10 in turn shows a graph which details how the curing step is carried out, in particular by showing the various temperature and pressure conditions applied in this step. On the graph:

line (a) corresponds to the temperature (in ° C.) of the heating plates of the press as a function of time (in minutes). It also substantially corresponds to the temperature of the tooling element assembly, as well as that of the stack;

line (b) corresponds to the temperature (in ° C.) of the injection resin as a function of time (in minutes);

line (c) corresponds to the pressure (in bar) on the stack applied by the press via the mould, as a function of time (in minutes);

line (d) corresponds to the pressure (in bar) of the injection resin in the mould as a function of time (in minutes); and line (e) corresponds to the amount (in liters) of injection resin circulating through the mould as a function of time (in minutes). The mould 50 is first of all introduced into a heated plate press 60 as can be seen in the first diagram of FIG. 9. The next diagram shows the press being closed.

At a time t0, the mould 50 is heated by the heating plates 60, where the latter are brought to a temperature T1 which is of order, for example, of 80 to 120° C., at a speed of 1.5 to 2.5° C./min, as shown by line (a). Simultaneously, an injection resin intended to be circulated later in the mould 50 is heated to a temperature T0, which is for example of the order of 60 to 100° C., as shown by line (b). This resin is preferably of the same kind as that of the pre-impregnated fibres of the stack.

At the time t'0, the temperature of the heating plates 60 reaches the value T1, which is maintained for an ageing period for the resin in the pre-impregnated fibre layers in the stack, which lasts a maximum of 20 minutes up to the time t1. This ageing may also apply to the resin of the adhesive films in the stack. Some resins however do not need to undergo ageing, so that the time t1 then corresponds to time t'0.

At this time t1, after the temperature of the heating plates has stabilised at temperature T1 and the ageing of the resin of the stack, the injection resin 62 is circulated in the mould 50 as shown in the third diagram in FIG. 9, and as shown by line (e). This circulation is achieved using conventional means, of the vacuum pump and resin reservoir type. The circulation of the injection resin 62 is carried out at a pressure P'1, of the order of 1 to 3 bars as shown in line (d), and is accompanied by a rise in temperature from temperature T0 to temperature T1. The injection resin 62 present in the volume L1 in the mould, generates a counter pressure at the periphery of the stack around which its circulates before being continuously recirculated, the function of this counter pressure being to pressurise the resin contained in the stack 14. Consequently the injection resin 62 is not meant to flow through the stack 14, but essentially serves to confine the resin of the pre-impregnated materials in order to prevent faults/voids appearing at the periphery of the stratified material obtained.

At a time t'1 which is separated by a period of less than 20 minutes from time t1, the pressure of the injection resin 62 and the pressure on the stack 14 applied by the press 60 via the mould 50, shown schematically by line (c), are both rapidly brought to a value P1 which is, for example, of the order of 7 bar. As for the temperature of the resin 62 and the temperature of the heating elements 60, these are maintained at the value T1 up to an instant t"1, at which an increase in the temperature of the injection resin and of the plates is initiated, up to a temperature T2 of the order of 175 to 185° C. for an Epoxy resin and of the order of 185 to 195° C., and preferably at a speed of about 1.5 to 2.5° C./min.

The value T2 is reached at a time t2 which corresponds to the setting of the resin of the stack, which causes this resin to shrink. After the stack resin has set, the circulation of the injection resin is stopped, and the resin remains present in the mould 50, being introduced between the stack 14 and each of the two mould surfaces 52, 54 in order to apply a surface pressure on this stack. The introduction of the resin 62 between the stack 14 and the two surfaces 52, 54 is made possible due to the fact that during the shrinkage of the stack resin the upper part of the mould starts to bottom out on the lower part of the mould, whereas there was initially a significant gap provided between these two parts. Nevertheless the introduction of the resin between the stack 14 and the two surfaces 52, 54 maintains the level of the pressure applied by the press on the stack via the mould 50, but also via the injection resin 62 which then transmits this pressure to the stack 14.

The pressure applied by the injection resin 62 on the upper and lower surfaces of the stack 14 is therefore maintained until the injection resin sets, at a time t3 which is separated by a period of, for example, less than 20 minutes from time t2. After this setting the shrinkage of the injection resin results in the pressure applied by the press on the stack falling to a very low value P0, just as the set injection resin pressure falls to this value.

After the injection resin has set, the temperature of the press 60 is maintained at temperature T2 up to a time t4 which is separated by a period of 120 to 210 minutes from time t2 for an Epoxy resin, and a period of 180 to 210 minutes for a BMI resin, during which complete polymerisation of the leading edge skin occurs. It should be noted that during this polymerisation, shown in the fourth diagram of FIG. 9, the slots 42 in the stack are consolidated by the resin of the pre-impregnated fibre layers.

Then, as has been shown in the last two diagrams of FIG. 9, the mould is extracted from the press, then opened, and the laminated skin 4 is withdrawn from the mould before undergoing trimming.

Figure 11:
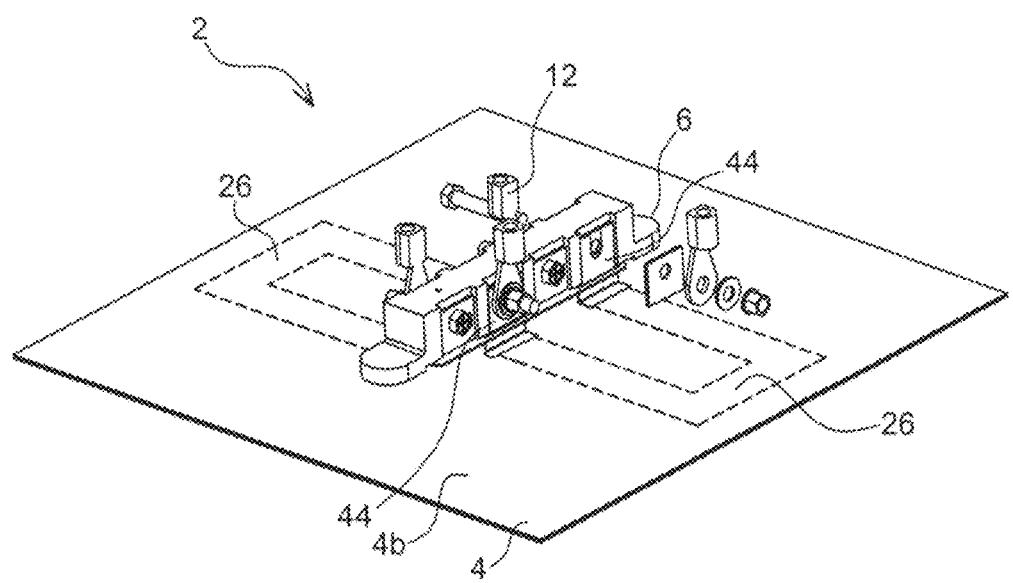
FIG. 11 shows a schematic view of the connection of a terminal block onto the connection terminals of the heating elements.

Finally, with reference to FIG. 11, the leading edge is completed by fitting the terminal blocks 6 onto the interior surface 4b of the skin 4, and by connecting the connection terminals 44 for the heating elements 26 onto them. The terminals 44 are preferably thread-fastened onto the terminal blocks 6 allowing these heating elements 26 to be connected to the wiring system 12.

The precise positioning of the resistive elements 26 favours easy assembly/disassembly of the terminal blocks, which is particularly important for handling purposes.

It should be noted, however, that other means of connection can be envisaged for the electrical connection of the terminals 44, for example soldering/brazing, and that the terminals 44 may or may not protrude from the stack.

Naturally those skilled in the art may make various modifications to the invention which has just been described, solely as non-restrictive examples.

The invention claimed is:

1. A method for producing a skin of a leading edge for an aircraft wing element, comprising an assembly of resistive heating elements designed to form an integral part of a system for de-icing and/or anti-icing of the leading edge, said method comprising:
curing a stack in a mould between two moulding surfaces facing each other, said stack comprising:
said assembly of resistive heating elements;
two adhesive films arranged respectively on either side of said assembly so that the resistive heating elements adhere to each of these two adhesive films;
two layers of electrically insulating pre-impregnated fibres adhering respectively to said two adhesive films on the sides opposite those receiving said resistive heating elements; and
a plurality of layers of pre-impregnated carbon fibres, wherein said curing is achieved by an implementation of following successive operations:
keeping on circulating an injection resin in said mould so as to generate and keep a counter-pressure at a periphery of the stack for pressurization of the injection resin contained in said stack until the injection resin of the stack has set; then
stopping the circulating of the injection resin after the injection resin of the stack has set, leading to the injection resin being introduced between the stack and each of the two mould surfaces in order to apply a surface pressure on said stack until the said injection resin in said stack sets.

2. The method according to claim 1, wherein said assembly of resistive heating elements further comprises a plurality of electrical connection terminals which pass through one or more holes made through the stack elements located on one side of said resistive heating elements, said connection terminals protruding from said stack in such a way as to be inserted into recesses made on one of the two moulding surfaces.

3. The method according to claim 1, wherein said stack also comprises a metal panel at each end of the stack.

4. The method according to claim 1, wherein said resistive heating elements are placed flat on the corresponding adhesive film before being placed in the mould.

5. The method according to claim 1, wherein the keeping keeps on circulating the injection resin such that the counter-pressure does not decrease until the injection resin of the stack has set.

6. A method for producing a skin of a leading edge for an aircraft wing element, comprising an assembly of resistive heating elements designed to form an integral part of a system for de-icing and/or anti-icing of the leading edge, said method comprising:
curing a stack in a mould between two moulding surfaces facing each other, said stack comprising:
said assembly of resistive heating elements;
two adhesive films arranged respectively on either side of said assembly so that the resistive heating elements adhere to each of these two adhesive films;
two layers of electrically insulating pre-impregnated fibres adhering respectively to said two adhesive films on the sides opposite those receiving said resistive heating elements; and
a plurality of layers of pre-impregnated carbon fibres, wherein
said assembly of resistive heating elements further comprises a plurality of electrical connection terminals which pass through one or more holes made through the stack elements located on one side of said resistive heating elements, said connection terminals protruding from said stack in such a way as to be inserted into recesses made on one of the two moulding surfaces, and
each recess is filled with a block of silicone through which one or more of said electrical connection terminals pass.

7. A method for producing a skin of a leading edge for an aircraft wing element, comprising an assembly of resistive heating elements designed to form an integral part of a system for de-icing and/or anti-icing of the leading edge, said method comprising:

curing a stack in a mould between two moulding surfaces facing each other, said stack comprising:
said assembly of resistive heating elements;
two adhesive films arranged respectively on either side of said assembly so that the resistive heating elements adhere to each of these two adhesive films;
two layers of electrically insulating pre-impregnated fibres adhering respectively to said two adhesive films on the sides opposite those receiving said resistive heating elements; and
a plurality of layers of pre-impregnated carbon fibres, wherein
said layers of pre-impregnated carbon fibres form a core of said stack, the elements of the latter being arranged symmetrically in relation to said core, except for the assembly of resistive heating elements present on only one side of said core.

8. A method for producing a skin of a leading edge for an aircraft wing element, comprising an assembly of resistive heating elements designed to form an integral part of a system for de-icing and/or anti-icing of the leading edge, said method comprising:
curing a stack in a mould between two moulding surfaces facing each other, said stack comprising:
said assembly of resistive heating elements;
two adhesive films arranged respectively on either side of said assembly so that the resistive heating elements adhere to each of these two adhesive films;
two layers of electrically insulating pre-impregnated fibres adhering respectively to said two adhesive films on the sides opposite those receiving said resistive heating elements; and
a plurality of layers of pre-impregnated carbon fibres, wherein
said curing is achieved by an implementation of following successive operations:
heating the mould by a heated plate press designed to apply a pressure on the stack via the mould, the heated plates being brought to a temperature T1, and heating of an injection resin designed to be circulated in the mould, the injection resin being heated to a temperature T0;
after stabilisation of the temperature of the heating plates at temperature T1 and ageing of the stack resin, circulating at a time t1 the injection resin in the mould, so as to generate a counter-pressure at the periphery of the stack, for pressurization of the resin contained in the latter, said circulating the injection resin being carried out at a pressure P'1 with an increase in temperature from the temperature T0 to temperature T1;
at a time t'1, bringing the pressure of the injection resin and the pressure on the stack applied by the press via the mould to a value P1;
at a time t"1, increasing temperature of the injection resin and of the press up to a temperature T2 reached at a time t2 which corresponds to the setting of the stack resin;
after the stack resin has set, stopping the circulating the injection resin, which remains present in the mould, it being introduced between the stack and each of the two mould surfaces in order to apply a surface pressure on said stack, until the injection resin sets at a time t3; and
after the injection resin has set, maintaining the temperature of the press at a temperature T2 until a time t4, whereas the pressure on the stack applied by the press via the mould falls to a value P0.

9. The method according to claim 8, wherein the operation for raising the temperature of the injection resin and of the press initiated at time t"1 is achieved at a speed which is between 1.5 and 2.5° C./minute.

10. A method for manufacturing a leading edge of an aircraft wing element using a leading edge skin obtained by an implementation of a method for producing a skin of a leading edge for an aircraft wing element, comprising an assembly of resistive heating elements designed to form an integral part of a system for de-icing and/or anti-icing of the leading edge,
said method for manufacturing a leading edge of an aircraft wing element comprising:
curing a stack in a mould between two moulding surfaces facing each other; and
mounting one or more terminal blocks onto an internal surface of said skin and connecting thereon connection terminals for the resistive heating elements;
wherein said stack comprising:
said assembly of resistive heating elements;
two adhesive films arranged respectively on either side of said assembly so that the resistive heating elements adhere to each of these two adhesive films;
two layers of electrically insulating pre-impregnated fibres adhering respectively to said two adhesive films on the sides opposite those receiving said resistive heating elements; and
a plurality of layers of pre-impregnated carbon fibres, and wherein said curing is achieved by an implementation of following successive operations:
keeping on circulating an injection resin in said mould so as to generate and keep a counter-pressure at a periphery of the stack for pressurization of the injection resin contained in said stack until the injection resin of the stack has set; then
stopping the circulating of the injection resin after the injection resin of the stack has set, leading to the injection resin being introduced between the stack and each of the two mould surfaces in order to apply a surface pressure on said stack until the said injection resin in said stack sets.

11. The method according to claim 10, wherein the keeping keeps on circulating the injection resin such that the counter-pressure does not decrease until the injection resin of the stack has set.

* * * * *